(12) United States Patent
Lamm et al.

(10) Patent No.: US 8,098,809 B2
(45) Date of Patent: Jan. 17, 2012

(54) SYSTEM AND METHOD FOR SELF-SUPPORTING APPLICATIONS

(75) Inventors: Jacob Lamm, Brooklyn, NY (US);
Marvin Waschke, Bellingham, WA (US); Yaakov Shapiro, New Hempstead, NY (US)

(73) Assignee: Computer Associates Think, Inc., Islandia, NY (US)

( * ) Notice: Subject to any disclaimer, the term of this patent is extended or adjusted under 35 U.S.C. 154(b) by 987 days.

(21) Appl. No.: 10/775,260

(22) Filed: Feb. 9, 2004

(65) Prior Publication Data
US 2006/0136869 A1 Jun. 22, 2006

Related U.S. Application Data

(60) Provisional application No. 60/446,770, filed on Feb. 11, 2003.

(51) Int. Cl.
*H04M 7/00* (2006.01)
(52) U.S. Cl. .................................. 379/221.04; 379/157
(58) Field of Classification Search ............ 379/221.03–221.15; 717/109; 714/26, 48
See application file for complete search history.

(56) References Cited

U.S. PATENT DOCUMENTS

| | | | | |
|---|---|---|---|---|
| 5,761,502 | A * | 6/1998 | Jacobs | 707/103 R |
| 6,104,798 | A * | 8/2000 | Lickiss et al. | 379/201.12 |
| 6,249,578 | B1 * | 6/2001 | Gilles et al. | 379/207.13 |
| 6,269,350 | B1 | 7/2001 | Shah | 705/410 |
| 6,357,017 | B1 * | 3/2002 | Bereiter et al. | 714/27 |
| 7,209,916 | B1 * | 4/2007 | Seshadri et al. | 707/3 |
| 7,281,046 | B1 * | 10/2007 | Sunderasan et al. | 709/228 |
| 2002/0087479 | A1 | 7/2002 | Malcolm | 705/64 |
| 2002/0123983 | A1 * | 9/2002 | Riley et al. | 707/1 |
| 2002/0198753 | A1 | 12/2002 | Feldman et al. | 705/7 |

OTHER PUBLICATIONS

Hp OpenView service desk 4.0 product brief; 4 pages, Aug. 2001.
Knowlix Knowledge Management Suite; 2 pages, Mar. 2000.
*European Patent Office; Supplementary European Search Report* for Application No. 04709886.8-1225 / 1627273 PCT/US2004003983; 3 pages, May 7, 2010.
*European Patent Office; Communication Pursuant to Article 94(3) EPC* for Application No. 04 709 886.8-1225; 4 pages, Aug. 29, 2011.

* cited by examiner

*Primary Examiner* — Curtis Kuntz
*Assistant Examiner* — Amal Zenati
(74) *Attorney, Agent, or Firm* — Baker Botts L.L.P.

(57) ABSTRACT

A method and system self-supportable devices and applications are provided. The method and system in one embodiment allows devices and applications to automatically communicate and service themselves, for example, by checking knowledgebase services and other services for instructions on how to handle an exception. In another embodiment, the devices and applications automatically initiate actions needed to handle the exception.

24 Claims, 4 Drawing Sheets

SYSTEM AND METHOD FOR SELF-SUPPORTING APPLICATIONS

CROSS-REFERENCE TO RELATED APPLICATIONS

This application claims the benefit of U.S. Provisional Patent Application No. 60/446,770, entitled SYSTEM AND METHOD FOR SELF-SUPPORTING APPLICATIONS filed on Feb. 11, 2003, which application is incorporated herein by reference in its entirety.

BACKGROUND

Traditionally, applications and help desks have been separate entities that have relied on human intervention to report failures and deliver support to the end user of the application. This process is costly, time-consuming, and inefficient. The system and method of the present application in one embodiment eliminates or reduces the human intervention in trouble shooting issues that are essentially problems in automation mechanisms.

SUMMARY

The system and method in one embodiment use web services to embed the functionality of the service delivery systems (help desk, knowledge bases, diagnostic tools, etc.) into the applications that use them. The system and method in one embodiment provide a standard interface to the service delivery system so that supported applications and devices can interact with them in a similar fashion. Embedding the support functionality into the technical environment allows effective issue identification, notification, diagnostics and ultimately, resolution. The closer the service technology is to the actual problem the better chance it has to respond in a timely and appropriate manner.

DETAILED DESCRIPTION

Figure 1:
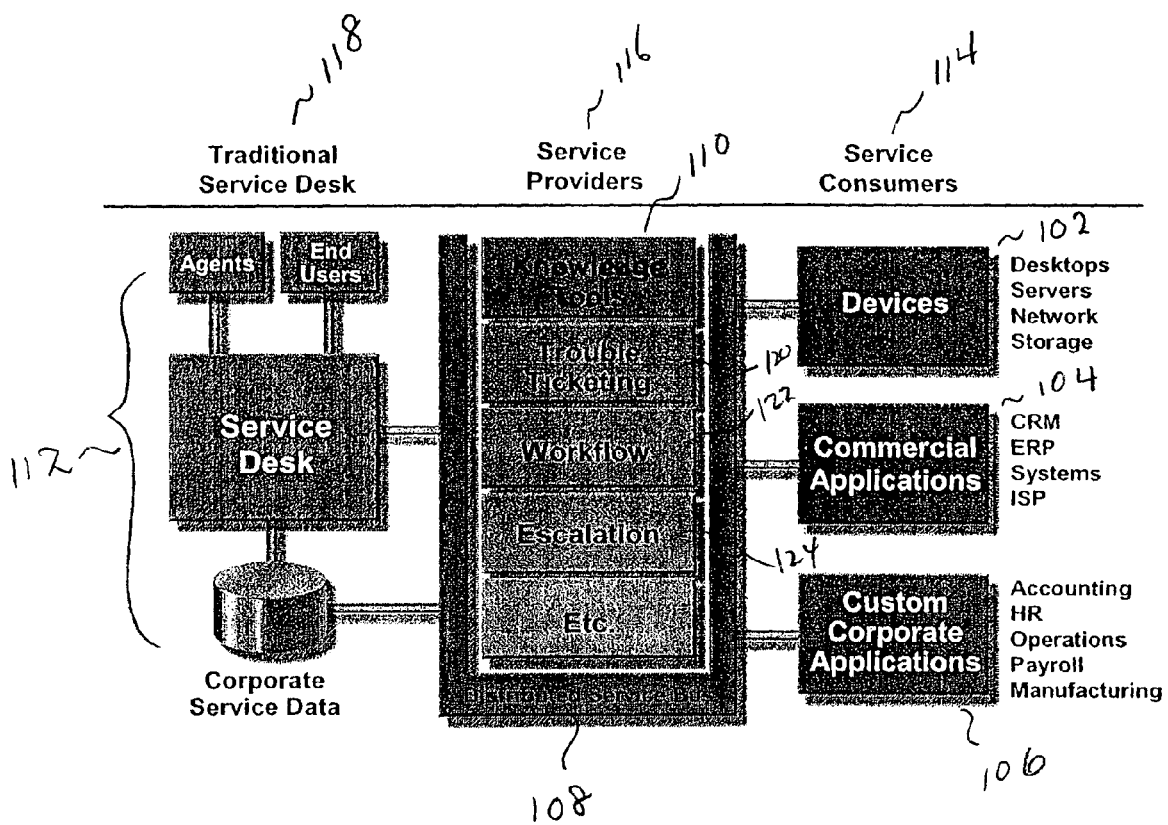
FIG. 1 illustrates a block diagram according to the present application in one embodiment.

FIG. 1 illustrates a block diagram according to the present application in one embodiment. When a fault occurs, today's applications such as word processors and email delivery systems often produce information needed to resolve the fault. For example, the raw information appears in the detailed error messages on the user's screen and in some instances, logs on the systems. When a complex application faults, the typical human user is daunted and ill prepared to transmit this information to the help desk.

The system and method of the present disclosure in one embodiment takes the next step in automating the issue resolution process by linking the applications themselves into the support mechanism for the enterprise. When a fault occurs, instead of throwing up an error message and halting or crashing, the applications or devices 102, 104, 106 themselves are aware of the service system 108, 110, connects with it, and takes the appropriate action.

The system and method in one embodiment open up the business rules and workflow that previously involved only the help desk organization 112, and makes them available to other applications. This allows these business rules to act as the hub of an Enterprise Service Model that can be consulted by applications and hardware when support is needed. As a result, enterprise service policies are automated all the way to the end user.

Service consumers 114 such as applications 104, 106 and hardware services 102 themselves by checking knowledge base services provided by service providers 116, for example, for instructions on how to handle an exception, check the service level of the user through other services and where necessary escalate to a service desk triggering an escalation.

Service consumers 114 may include any entity that may require a service. That entity may be an application, hardware device, the network, or an actual person. The service consumer may request a fix when something is broken. The service consumer may also request service related information, scheduled maintenance, diagnostics, service procedures, or anything defined by corporate policy as in the domain of the service organization. These may include business procedures in response to business events that are not necessarily technical issues.

Service providers 116 may be any entity that provides these services to the consumer. Service providers 116 may be people, applications, or devices that participate in the support infrastructure and have access to the corporate service and support policy.

The system of the present application may reside alongside the traditional service desk 118. At least a part of the functionality that used to reside inside the service desk application may be pulled out and made available via a "distributed service bus" 108. This bus may provide functions such as a common access infrastructure for all service consumers 114 to request service; a container for all service providers 116, giving them a common vehicle to expose their available services, and an intermediary between the service providers 116 inside the bus and the service consumers 114 on the outside; housing for the service policy and business rules that govern the behavior of the system of the present application and that is accessed by both service providers and 116 consumers 114.

In one embodiment, the traditional service desk application 118 may be treated as another service consumer requesting services through the distributed service bus 108.- Further, devices 102, commercially available applications 104, and custom corporate applications 106 may be treated as service consumers 114 and may plug into the system of the present disclosure to provide support to their users.

In one embodiment, the system and method of the present application allows the service consumers 114 to service themselves. As an example, a service consumer 114 that encounters an exception can query the business policy, for example, a part of the distributed service bus 108, to determine what course of action to take under the current circumstances. It may need to determine information such as the user's service level agreement, if a knowledge base 110 contains pertinent information about the current condition, should a trouble ticket 120 be opened and with what associated information, or should an escalation 124 be initiated with the associated notifications. The service policy may also dictate that related procedures be initiated, for example, an automated software delivery update, or an automatic password reset. This may result in a fix to the original issue, which can then be automatically closed.

As another example, a common feature of hardware devices is their ability to contact the vendor to notify the service department of some service event or breakdown. In one aspect, this functionality may be extended to first contact a service policy supported by the distributed service bus 108 to find out what action or actions need to be taken.

The service policy according to various business rules may be able to respond to such questions as should this issue be addressed internally or is a vendor input required; who is the service vendor and what is the service level agreement in place; is there a warranty in place; is the hardware coming off lease shortly and does it pay to have it repaired; is there knowledge available in the knowledge base that can help diagnose or repair the current situation.

In another example, commercial applications 104 may plug into the system of the present disclosure and make those applications more supportable. For instance, when an error or any event requiring intervention is encountered, the applications 104 can consult with the system of the present application to determine the level of service required and react accordingly. For example, questions such as who is the user and what is their service level agreement; should a workflow be initiated to address the problem; is an escalation or a notification required; does the user need additional training; what does the business policy say regarding the priority of this issue versus others that currently need attending to; what is the cost versus benefit of fixing the problem are triggered and processed.

In one embodiment, multiple service providers 116, which may include multiple service vendors, may be involved in effecting a resolution. For instance, a system monitoring agent component, in one aspect of the present disclosure, receiving the message triggered from a service consumer 114 may indicate that an application 102 is having performance issues and may automatically open a service desk workflow 124 which will initiate an asset discovery. This, in turn, may indicate that a software delivery update needs to take place in order to resolve the problem. Throughout the process, the service policy may dictate the appropriate course of action, authorization, and priority.

Similarly, custom corporate applications may incorporate or embed in them the logic to for having access and knowledge of the system of the present disclosure. For example, a custom built line of business application can determine, using the system of the present disclosure, that a user that is repeatedly selecting the wrong application options or entering erroneous data may need training, and that individual can be automatically enrolled in the appropriate training course. In another example, the user may be determined as a senior executive, whose service level agreement may indicate an immediate escalation and call-back according to the service policy housed in the system of the present disclosure. In this case, the user may get a call a minute later from a service analyst providing proper instructions in using the business application.

In one embodiment, under the system of the present disclosure, a traditional service desk functionalities may be extended to include maintaining service policies such as determining, interpreting and encoding the service policies, automating service standards and methodologies, integrating partner applications and devices under the system of the present disclosure, and developing and adopting internal standards for the system of the present disclosure.

In its basic use, any application or device can become more supportable by linking directly to the service delivery systems. The technical infrastructure and people who use it are supported by the system of the present disclosure, which automates service procedures and deploys point solutions. The system of the present disclosure integrates the technical environment and the service tools under a common provider/consumer model that is governed by a corporate service policy. A more supportable application or device will decrease downtime and user frustration, increasing productivity and user satisfaction.

Figure 2:
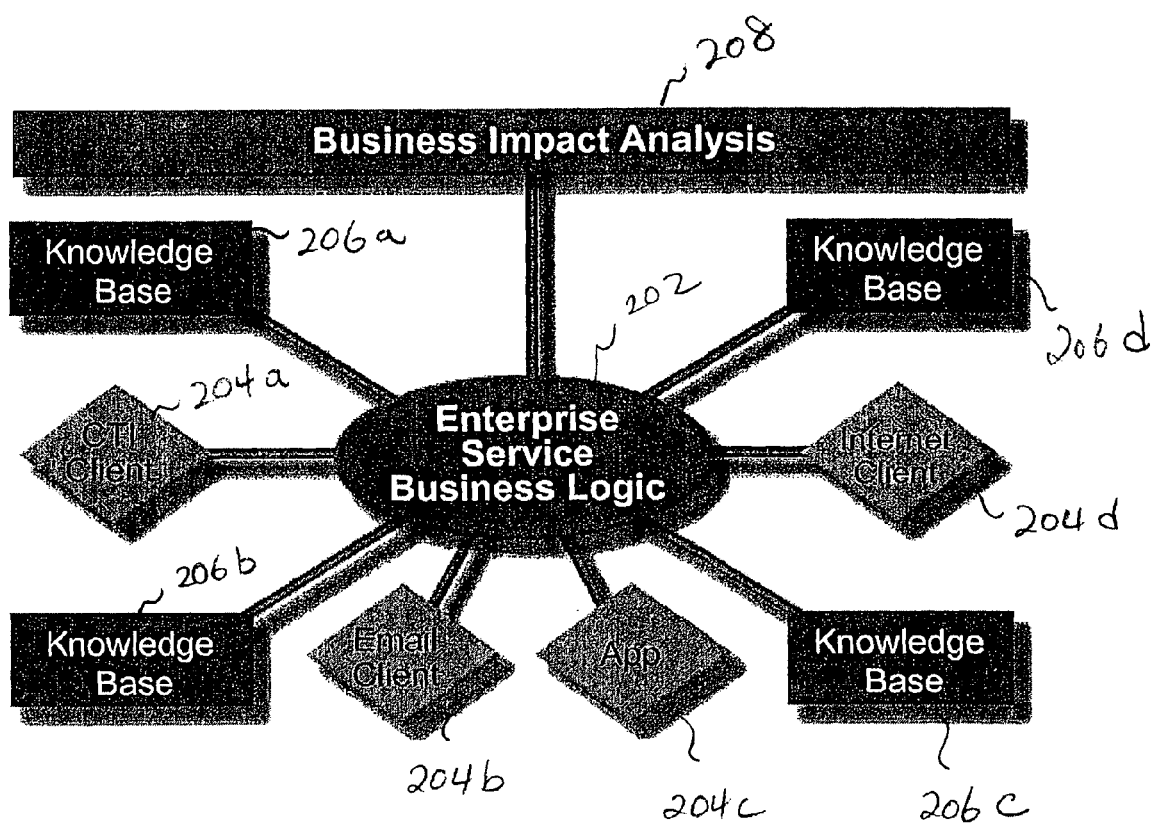
FIG. 2 illustrates another block diagram according to the present application in one embodiment.

FIG. 2 illustrates another block diagram according to the present application in one embodiment. In one embodiment, the system of the present application includes an enterprise service business logic 202 that provides business or support policies related to the business. The system of the present disclosure in one embodiment allows service consumers such as CTI client 204*a*, email client 204*b*, applications 204*c*, Internet client 204*d* to consult the enterprise service business logic 202 and corresponding knowledge base 206*a-d*, to enable the service consumers 204*a-d* to retrieve information and initiate service action flows as dictated by the enterprise service business logic 202.

In addition to bringing these components together to provide service, the system of the present application in one embodiment provides feedback to the corporate decision makers to facilitate a proactive position in the development and maintenance of service policy defined in the enterprise service business logic 202 via a business impact analysis 208. The business impact analysis 208 communicates with the enterprise service business to retrieve information related to all service events processed in the enterprise service business logic 202. Using the retrieved information, the business impact analysis 208 may fine-tune the current service policy used in the enterprise service business logic 202, for example, towards increasing positive business impacts and reducing negative impacts.

Figure 3:
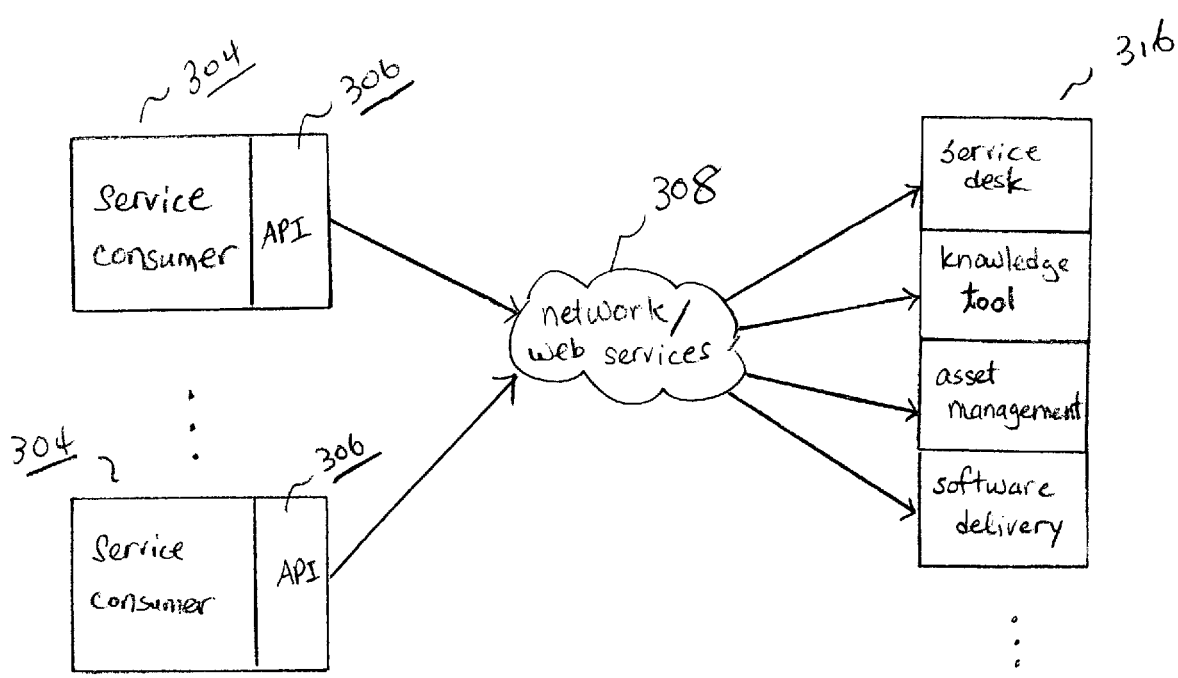
FIG. 3 is an architectural diagram according to the present application in one embodiment.

FIG. 3 is an architectural diagram according to the present application in one embodiment. The method and system of the present disclosure in one embodiment may be implemented in part as a web service application programming interface (API) 306 interfacing to service provider tools 316 via web services 308, which service provider tools 316, for example, are for aiding end users and analysts in searching, retrieving, sharing, and applying knowledge to help solve IT-related issues, and built upon the standards set by the World Wide Web Consortium. The API 306 may provide services over the well-known HTTP protocol using recognized standard such as SOAP and WSDL, making it accessible by clients 304 on multiple platforms.

Figure 4:
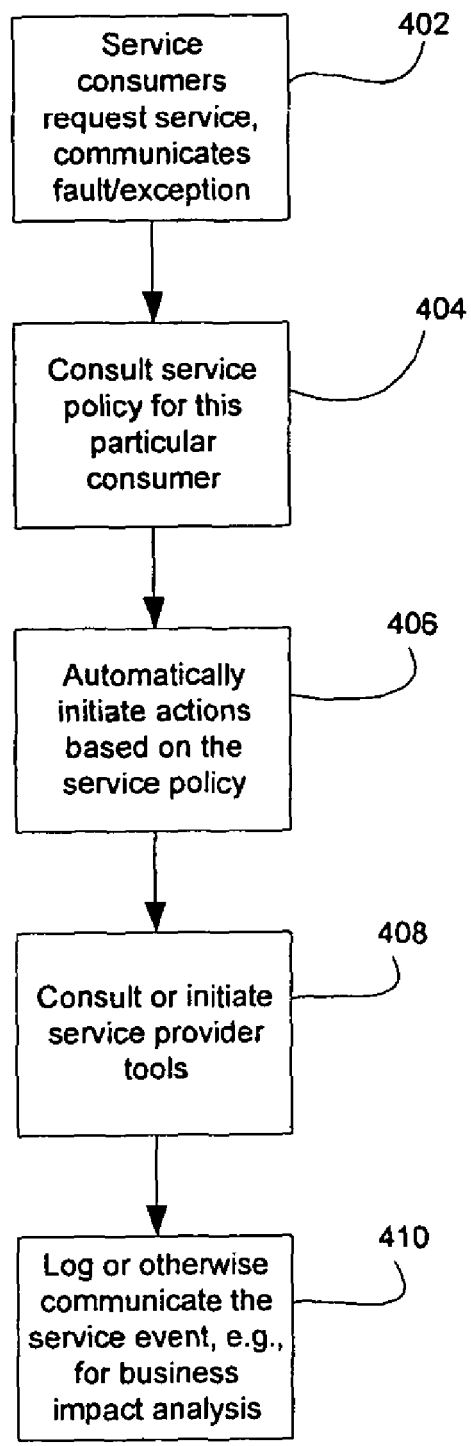
FIG. 4 is a flow diagram according to the present application in one embodiment.

FIG. 4 is a flow diagram according to the present application in one embodiment. At 402, a service consumer such as software applications or hardware devices requiring service, for example, due to a fault or exception occurring during processing of the software applications or hardware devices, communicates the fault, exception, or service request to a module responsible for consulting service policy for this particular service consumer. The module responsible for consulting service policy may be an integrated part of the service consumer, or alternatively reside separately in a distributed network environment.

At 404, service policy is consulted for this particular consumer. The service policy may have information such as the service level agreement, priority of service, whether knowledgebase should be consulted first, whether related procedures should be initiated, etc.

At 406, appropriate actions determined according to the service policy are initiated. For instance, at 408, a trouble ticket may be opened, escalation may be initiated, software may be automatically updated, or a password may be reset, etc.

At 410, service events processed as a result of this service consumer's request is logged or otherwise communicated, for example, for business impact analysis in which the service policy may be fine-tuned or modified.

The system and method described in the present disclosure may be implemented on a general purpose computer and/or specialized computer. Communications among devices and software modules and applications may take place through any known communications medium. The embodiments described above are illustrative examples of the present application and it should not be construed that the present application is limited to these particular embodiments. Various changes and modifications may be effected by one skilled in the art without departing from the spirit or scope of the invention as defined in the appended claims.

We claim:

1. A method of providing self-supporting computer systems, comprising:
   detecting, with a computer system, a fault that has occurred in the computer system;
   automatically consulting, using the computer system, a service policy comprising one or more service policy rules associated with the computer system to request a solution for the detected fault that occurred in the computer system;
   automatically determining, based on the service policy, one or more actions to be taken to respond to the request, the one or more actions related to providing the solution to the detected fault, wherein the actions to be taken comprise:
      determining, based on the service policy, a service level agreement associated with a user of the computer system;
      determining, based on the service policy, whether a trouble ticket should be opened; and
      determining whether a password associated with the computer system should be reset;
   automatically initiating one or more of the actions;
   automatically invoking one or more service provider tools to perform one or more of the actions in response to the request; and
   communicating one or more service events that occurred as a result of the automatically initiating one or more of the actions and the automatically invoking one or more service provider tools wherein the communicating includes logging the one or more service events.

2. The method of claim 1, wherein the actions to be taken further comprise determining, based on the service policy, whether a vendor associated with computer system can provide a solution to the detected fault.

3. The method of claim 1, wherein the actions to be taken further comprise determining, based on the service policy, whether a knowledge base contains information related to the detected fault.

4. The method of claim 1, wherein the actions to be taken further comprise determining, based on the service policy, whether software associated with the computer system should be updated.

5. A method of providing self-supporting computer systems, comprising:
   detecting, with a computer system, a fault that has occurred in the computer system;
   automatically consulting, using the computer system, a service policy comprising one or more service policy rules associated with the computer system to request a solution for the detected fault that occurred in the computer system;
   automatically determining, based on the service policy, one or more actions to be taken to respond to the request, the one or more actions related to providing the solution to the detected fault, wherein the actions to be taken comprise:
      determining, based on the service policy, a service level agreement associated with a user of the computer system;
      determining, based on the service policy, whether a trouble ticket should be opened; and
      determining whether a password associated with the computer system should be reset;
   automatically initiating one or of the more actions to be taken; and
   automatically invoking one or more service provider tools to perform one or more of the actions to be taken in response to the request.

6. The method of claim 5, further including:
   communicating one or more service events that occurred as a result of the automatically initiating one or more actions and the automatically invoking one or more service provider tools.

7. The method of claim 5, wherein the service policy rules are specific to the computer system.

8. The method of claim 5, wherein the software applications include over-the-counter applications, custom applications, or combinations thereof.

9. The method of claim 5, wherein the one or more service provider tools include knowledgebase, trouble ticketing tool, escalation tool, workflow tool, software delivery tool, or combinations thereof.

10. The method of claim 5, further including allowing the service policy to be modified based on the automatic initiating and the automatic invoking steps.

11. A self-supporting computer system, comprising:
    a memory configured to house a service policy comprising one or more service policy rules associated with a computer system;
    a processor configured to:
       detect a fault that has occurred in a computer system;
       automatically consult the service policy to request a solution for the detected fault that occurred in the computer system;
    automatically determining, based on the service policy, one or more actions to be taken to respond to the request, the one or more actions related to providing the solution to the detected fault, wherein the actions to be taken comprise:
       determining, based on the service policy, a service level agreement associated with a user of the computer system;
       determining, based on the service policy, whether a trouble ticket should be opened; and
       determining whether a password associated with the computer system should be reset;
    automatically initiate one or more of the actions to be taken; and
    automatically invoke one or more service provider tools to perform one or more of the actions to be taken in response to the request.

12. The system of claim 11, further including:
an interface operable to communicate through a web service with the computer system over the world wide web via a web-enabled application programming interface residing in the computer system.

13. The system of claim 11, wherein the computer system includes one of a hardware device, a software application, or a combination thereof.

14. The system of claim 11, wherein the service includes handling an exception that occurred in the computer system.

15. The system of claim 11, wherein the one or more service provider tools include knowledgebase, trouble ticketing tool, escalation tool, workflow tool, software delivery tool, or combinations thereof.

16. The system of claim 11, wherein the one or more actions comprise servicing the computer system in response to the computer system's request, and further including:
an analysis tool operable to receive events occurring as a result of servicing the computer system, the analysis tool further operable to modify the service policy based on received events.

17. A program storage device readable by machine, tangibly embodying a program of instructions executable by the machine to perform method steps of providing a self- supporting computer system, the method comprising:
automatically consulting, using the computer system, a service policy comprising one or more service policy rules associated with the computer system to request service;
automatically determining from the service policy, one or more actions to be taken to respond to the request for service, the one or more actions related to servicing the computer system, wherein the actions to be taken comprise:
determining, based on the service policy, a service level agreement associated with a user of the computer system;
determining, based on the service policy, whether a trouble ticket should be opened; and
determining whether a password associated with the computer system should be reset;
automatically initiating one or more of the actions to be taken; and
automatically invoking one or more service provider tools to perform one or more of the actions to be taken in response to the request for service, wherein:
automatically consulting, using the computer system, the service policy comprises:
receiving the request for service from the computer system independent of a user-initiated request for service; and
comparing the request for service with the service policy.

18. The program device of claim 17, wherein:
the computer system is a processor-controlled device that requires servicing.

19. The program device of claim 18, wherein:
the policy includes instructions for servicing the computer system; and
the one or more actions comprise servicing the computer system in accordance with the instructions; and
servicing the computer system comprises repairing a fault in the computer system.

20. The program device of claim 17, wherein:
the computer system is a processor-controlled device that requires servicing;
the steps of allowing, automatically determining, automatically initiating, and automatically invoking occur at a service provider;
servicing the computer system comprises repairing a fault in the computer system; and further comprising:
when it is determined that the computer system needs servicing, automatically linking the computer system to the service provider to enable the service provider to service the computer system.

21. The program device of claim 17, further comprising determining from the policy whether the computer system is covered by a warranty covering the request for service.

22. The program device of claim 17, further comprising modifying the one or more service policy rules in response to one or more service events that occurred as a result of the one or more actions.

23. The program device of claim 20, wherein the computer system and the service provider are separate entities.

24. The method of claim 5, wherein the one or more actions provide the solution to the fault.

* * * * *